(12) United States Patent
Onaka et al.

(10) Patent No.: US 8,774,624 B2
(45) Date of Patent: Jul. 8, 2014

(54) OPTICAL TRANSMISSION APPARATUS AND OPTICAL COMMUNICATION SYSTEM

(75) Inventors: Miki Onaka, Kawasaki (JP); Yuichi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 12/230,172

(22) Filed: Aug. 25, 2008

(65) Prior Publication Data

US 2009/0169212 A1 Jul. 2, 2009

(30) Foreign Application Priority Data

Dec. 26, 2007 (JP) ................................. 2007-334945

(51) Int. Cl.
*H04B 17/00* (2006.01)
(52) U.S. Cl.
USPC .......................................... 398/30; 398/140
(58) Field of Classification Search
USPC ........................................................... 398/30
See application file for complete search history.

(56) References Cited

U.S. PATENT DOCUMENTS

| | | | |
|---|---|---|---|
| 5,113,459 A | 5/1992 | Grasso et al. | |
| 6,347,008 B1 * | 2/2002 | Vodhanel | 359/337.4 |
| 6,532,102 B2 * | 3/2003 | Kobayashi et al. | 359/334 |
| 6,560,008 B1 * | 5/2003 | Wada | 359/337 |
| 6,587,260 B2 * | 7/2003 | Kikuchi et al. | 359/334 |
| 6,603,596 B2 * | 8/2003 | Inagaki et al. | 359/341.4 |
| 6,765,659 B1 * | 7/2004 | Bhatnagar et al. | 356/73.1 |
| 6,819,875 B2 * | 11/2004 | Touma | 398/177 |
| 6,975,811 B1 * | 12/2005 | Kakizaki et al. | 398/2 |
| 7,042,636 B2 * | 5/2006 | Hayashi et al. | 359/349 |
| 7,099,595 B2 * | 8/2006 | Touma | 398/177 |
| 7,248,804 B2 * | 7/2007 | Maeda et al. | 398/180 |
| 7,330,651 B2 * | 2/2008 | Yamashita | 398/25 |
| 7,463,829 B2 * | 12/2008 | Uda et al. | 398/97 |
| 7,899,331 B2 * | 3/2011 | Itoh et al. | 398/97 |
| 7,917,030 B2 * | 3/2011 | BuAbbud et al. | 398/37 |
| 7,933,063 B2 * | 4/2011 | Onaka | 359/334 |
| 8,606,115 B2 * | 12/2013 | Onaka | 398/194 |
| 2002/0037131 A1 * | 3/2002 | Naganuma | 385/27 |
| 2002/0126336 A1 | 9/2002 | Sekiya et al. | |
| 2002/0167716 A1 * | 11/2002 | Yamanaka | 359/334 |

(Continued)

FOREIGN PATENT DOCUMENTS

| | | |
|---|---|---|
| JP | 7-87026 | 3/1995 |
| JP | 2000-332331 | 11/2000 |
| JP | 2002-261693 | 9/2002 |

OTHER PUBLICATIONS

Japanese Patent Office Action issued in Japanese Patent Application No. 2007-334945 dated Dec. 27, 2011.

*Primary Examiner* — Ken Vanderpuye
*Assistant Examiner* — Amritbir Sandhu
(74) *Attorney, Agent, or Firm* — Staas & Halsey LLP

(57) ABSTRACT

An optical communication system, where in an optical transmission apparatus arranged on a transmission side of respective repeating sections, an OSC optical amplifier is provided on an OSC light optical path between from an OSC transmitter to a multiplexer, and the OSC optical amplifier is controlled so that the power of OSC light transmitted on the transmission path becomes a previously set target value. As a result the OSC light is amplified by a different amplifying device to that for the main signal lights at the time of transmission. Therefore even in the case where the span losses are large, OSC light can be reliably received by the optical transmission apparatus on the reception side.

5 Claims, 4 Drawing Sheets

(56) References Cited

U.S. PATENT DOCUMENTS

| | | | |
|---|---|---|---|
| 2004/0042063 A1* | 3/2004 | Ohtani et al. | 359/341.3 |
| 2004/0264956 A1* | 12/2004 | Touma | 398/37 |
| 2005/0041968 A1* | 2/2005 | Takahashi | 398/30 |
| 2005/0213968 A1* | 9/2005 | Uda et al. | 398/30 |
| 2005/0220454 A1* | 10/2005 | Okuno | 398/30 |
| 2005/0225843 A1* | 10/2005 | Sugaya et al. | 359/337.1 |
| 2006/0018658 A1* | 1/2006 | Mori | 398/79 |
| 2006/0082868 A1* | 4/2006 | Yamashita | 359/337 |
| 2006/0140626 A1* | 6/2006 | Robinson et al. | 398/30 |
| 2007/0086332 A1* | 4/2007 | Way et al. | 370/223 |
| 2007/0098411 A1* | 5/2007 | Ghera et al. | 398/177 |
| 2008/0068700 A1* | 3/2008 | Kawahara et al. | 359/333 |
| 2008/0080867 A1* | 4/2008 | Itoh et al. | 398/97 |
| 2008/0232797 A1* | 9/2008 | Muzicant | 398/30 |
| 2009/0022489 A1* | 1/2009 | Way | 398/4 |
| 2009/0195862 A1* | 8/2009 | Kondoh et al. | 359/334 |
| 2009/0237778 A1* | 9/2009 | Onaka | 359/334 |
| 2010/0080562 A1* | 4/2010 | Perkins et al. | 398/98 |
| 2012/0207469 A1* | 8/2012 | Tanaka | 398/33 |
| 2012/0224848 A1* | 9/2012 | Yano | 398/20 |

* cited by examiner

OPTICAL TRANSMISSION APPARATUS AND
OPTICAL COMMUNICATION SYSTEM

CROSS-REFERENCE TO RELATED
APPLICATION

This application is based upon and claims the benefit of priority of the prior Japanese Patent Application No. 2007-334945, filed on Dec. 26, 2007, the entire contents of which are incorporated herein by reference.

FIELD

The present invention relates to an optical transmissions apparatus and an optical communication system furnished with a function for transmitting system information using supervisory light different to the main signal light.

BACKGROUND

As a background for the recent increase in communication traffic, the demand for optical communication/transmission apparatuses is increasing. Not only for optical repeating nodes introduced with backbone networks, but also recently, the introduction of optical transmission apparatuses for local networks is being actively performed. Furthermore, optical networks are also being formed for subscriber loops. In this manner, optical communication systems bear an important role with respect to world information networks. Therefore, naturally, high reliability is required for optical communication systems.

As an important means for maintaining high reliability of optical communication systems, there is an information transmission function using optical supervisory channel (OSC). The OSC light is transmitted on a transmission path together with an optical communication signal (main signal light), and by transmitting operation information or performance information for an optical communication system to various parts in the optical communication system, maintenance of the transmission characteristics and smooth handling in the event of problems are realized. In conventional optical communication systems, normally, as shown in FIG. 4, OSC light Losc is arranged in a wavelength band separated from a wavelength band where a plurality of main signal lights Ls of different wavelength are arranged.

As a general system configuration for transmitting and receiving such OSC light Losc between optical transmission apparatuses, a configuration for example as shown in FIG. 5 is well known, where in the transmission side optical transmission apparatus 110, the OSC light Losc generated by an OSC transmitter 112 passes through a multiplexing filter 113 provided on the output side of a main signal optical amplifier 111 and is multiplexed with the main signal light Ls and transmitted to a transmission line 101, and the OSC light Losc transmitted to the transmission line 101, is separated in the reception side optical transmission apparatus 130, from the main signal light Ls by a branching filter 131 provided on the input side of a main signal optical amplifier 132, and received by an OSC receiver 133.

In the above optical communication system which uses OSC light, if the repeating distance between the optical transmission apparatuses becomes long, the losses of the transmission path increase. More specifically, the loss per unit length of the transmission path is generally around 0.2 dB/km, and the loss of the transmission path for one repeating section increases corresponding to the repeating distance. Furthermore, in the case where various functional optical components are arranged on the transmission path, the transmission losses of these functional optical components add up so that the span losses become even greater. Therefore, as the light level of the transmission light reaching the receiver side becomes smaller, the transmission characteristics deteriorate, so that there is a likelihood of an increase in the number of reception errors per unit time. In particular, for the aforementioned OSC light arranged in the wavelength band as shown in FIG. 4, the loss of the transmission path is greater than for the main signal light. Furthermore, since this also receives an influence from the Raman effect of the main signal light existing on the long wavelength side, a decrease in the light level after transmission is likely to occur.

In order to avoid the aforementioned transmission characteristic deterioration accompanying lengthening of the distance of the repeating section, then for the main signal light Ls, in the configuration of FIG. 5, this can be dealt with by increasing the gain (optical output power) of the main signal optical amplifier 111 on the transmission side. Furthermore, even when coping in this way, in the case where the light level of the main signal light Ls after transmission is insufficient, it is also effective to apply transmission path distributed Raman amplification (DRA) such as known from the document; M. Takeda et al., "Active Gain-Tilt Equalization by Preferentially 1.43 μm- or 1.48 μm-Pumped Raman Amplification", OAA '99, ThA 3-1, 1999, and add a DRA unit 150 for example as shown in FIG. 6, that inputs pumping light Lp into the transmission path 101, and then Raman amplify the transmission light using the amplification effect due to the induced Raman scattering effect. In this case, in the DRA unit 150, by providing a configuration for Raman amplifying the OSC light Losc (pumping light sources (LDs) 151C, multiplexers 152C and 153C) in addition to a configuration for Raman amplifying the main signal light Ls (pumping light sources (LDs) 151A and 151B, multiplexers 152A, 152B, 153B, and 154), it is possible to suppress a drop in the reception level not only of the main signal light Ls but also of the OSC light Losc.

Furthermore, as an alternative countermeasure to the above, it is also possible to use an optical direct amplifier as disclosed for example in Japanese Unexamined Patent Publication No. 2000-332331. This optical direct amplifier is one where, in the optical repeating transmission system, the transmission light in which the main signal light and the OSC light have been multiplexed is amplified by an optical direct amplifying device, after which the OSC light is separated from the output light of the optical direct amplifying device and received, and the OSC light is newly multiplexed on the main signal light after separation so as to become output light. By applying such an optical direct amplifier to the optical repeating transmission system, it is possible to suppress the deterioration in the transmission characteristics of the main signal light and the OSC light accompanying an increase in the distance of the repeating section.

However, in the above optical communication system that is made to correspond to an increase in the distance of the repeating section by applying the DRA unit or the optical direct amplifier, the configuration is such that the main signal lights and the OSC light are basically amplified by the same optical amplifying device. Therefore in the case where some kind of failure occurs in the optical amplifying device, there is a problem in that transmission of both the main signal light and the OSC light becomes impossible. That is to say, due to the aforementioned role of the OSC light, even if a disturbance arises in the transmission of the main signal light, it is necessary to normally operate transmission of the OSC light, and from this viewpoint, it is important to not use the same optical amplifying device as for the main signal light for transmission of the OSC light.

SUMMARY

The present invention addresses the above-mentioned points, with an object of providing an optical transmission apparatus and an optical communication system which can realize a high reliability in being able to correspond to an increase in the distance of the repeating section.

In order to achieve the above object, one aspect of the optical transmission apparatus is an optical transmission apparatus provided with: a main signal light amplifying device for amplifying main signal lights transmitted by an optical communication system; a supervisory light generating device for generating a supervisory light arranged in a wavelength band separate from a wavelength band of the main signal lights, and which includes information related to an operation status of the optical communication system; and a multiplexing device for multiplexing the supervisory light output from the supervisory light generating device, with main signal lights output from the main signal light amplifying device, and sending this to a transmission path, wherein a supervisory light amplifying device for amplifying the supervisory light is provided on an optical path between from an output end of the supervisory light generating device to a supervisory light input end of the multiplexing device.

Furthermore, in the optical transmission apparatus, there may be provided: a first supervisory light power detection device that detects the power of supervisory light input to the multiplexing device; and a control device for controlling the supervisory light amplifying device based on detection results of the first supervisory light power detection device, so that the power of supervisory light transmitted to the transmission path becomes a previously set target value.

One aspect of the optical communication system is that in an optical communication system that repeatedly transmits main signal lights by a plurality of optical transmission apparatuses arranged on a transmission path, and transmits system information by transmitting and receiving a supervisory light different to the main signal lights between optical transmission apparatuses of respective repeating sections, an optical transmission apparatus furnished with the above-mentioned supervisory light amplifying device is provided on a transmission side of the respective repeating sections, and an optical transmission apparatus on a reception side of the respective repeating sections comprises: a supervisory light reception device that spectrally demultiplexes and receives supervisory light contained in light transmitted on the transmission path; and a transmission path distributed Raman amplifying device that supplies pumping lights for Raman amplifying main signal lights propagated on the transmission path, to the transmission path.

In the above optical transmission apparatus and optical communication system, in the optical transmission apparatus arranged on the transmission side of the respective repeating sections on the system, by providing the supervisory light amplifying device on the optical path between from the output end of the supervisory light generating device to the supervisory light input end of the multiplexing device, the supervisory light transmitted to the transmission path is amplified by an optical amplifying device different to that for the main signal lights. Therefore even in the case where a large span loss is generated due to lengthening of the distance of the repeating sections, the supervisory light transmitted from the optical transmission apparatus on the transmission side to the transmission path, can be reliably received by the optical transmission apparatus on the reception side.

Consequently, according to the above optical transmission apparatus and optical communication system, even if a fault occurs in the transmission of the main signal lights, transmission of the supervisory light will normally operate. Therefore the cause of failure on the main signal side can be quickly specified, and error recovery quickly implemented, so that high reliability can be ensured. Furthermore, when Raman amplifying the main signal lights using the transmission path distributed Raman amplifying device, Raman amplifying of the supervisory light becomes unnecessary. Therefore the total power of pumping light supplied from the transmission path distributed Raman amplifying device to the transmission path can be reduced, and an increase in safety and a reduction in power consumption can be achieved.

Other objects, features and advantages of the present invention will become apparent from the following description of the embodiments, in conjunction with the appended drawings.

DESCRIPTION OF EMBODIMENTS

Hereunder is a description of embodiments for carrying out the present invention, with reference to the appended drawings. Throughout all the figures, the same reference symbols denote the same or equivalent parts.

Figure 1:
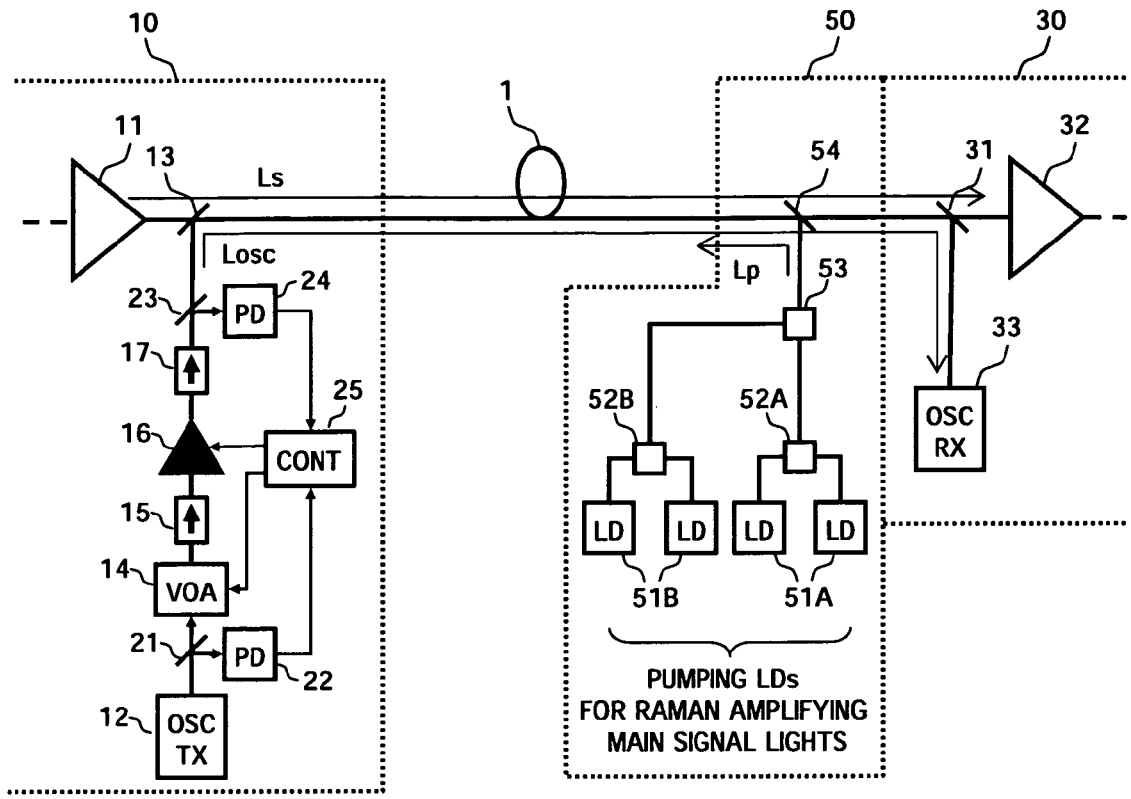
FIG. 1 is a block diagram showing a configuration of an embodiment of an optical communication system according to the present invention.

FIG. 1 is a block diagram showing a configuration of an embodiment of an optical communication system according to the present invention. This FIG. 1 shows a configuration example for transmitting and receiving main signal lights and OSC light in a single repeating section of the optical communication system. The same configuration as this is respectively provided in each repeating section on the optical communication system.

Figure 4:
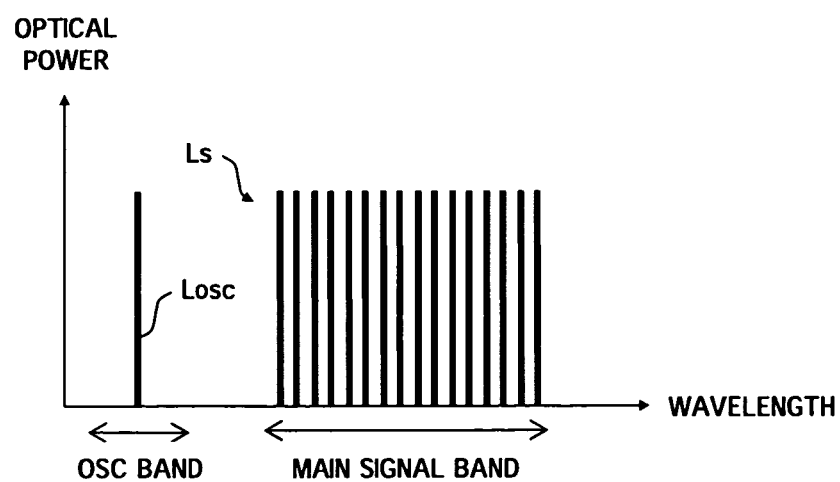
FIG. 4 is a diagram showing an example of a wavelength arrangement of main signal light and OSC light in a conventional optical communication system.
Figure 5:
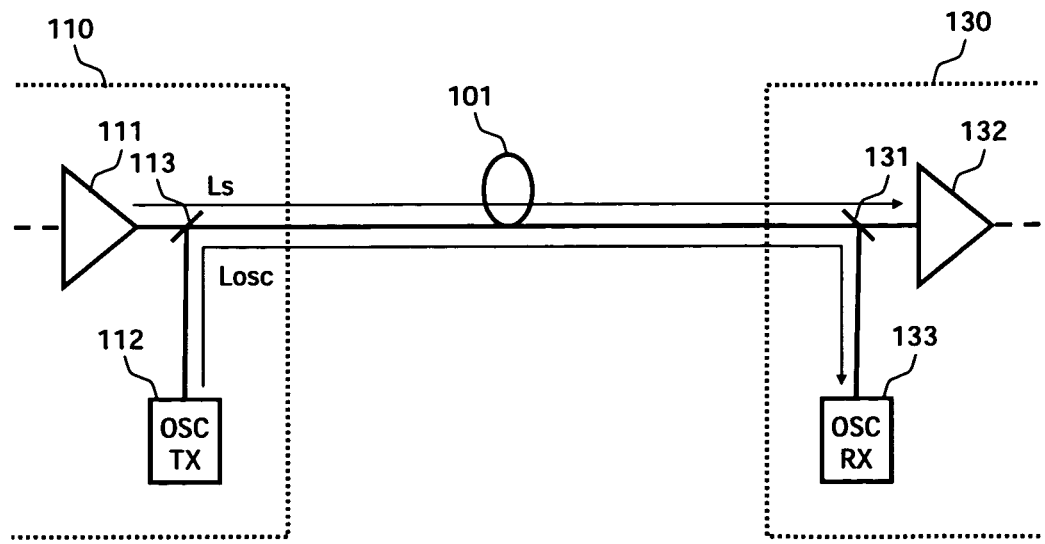
FIG. 5 is a block diagram showing an example of a general system configuration for transmitting and receiving OSC light between optical transmission apparatuses.

Furthermore, regarding the wavelength arrangement of the main signal lights and the OSC light in the optical communication system, similar to the aforementioned case shown in FIG. 4, the OSC light Losc is arranged in a wavelength band separated from the wavelength band in which the plurality of main signal lights Ls of different wavelengths are arranged. Here, as a specific example, the description is made with respect to the main signal lights Ls of the C-band (1530 to 1560 nm), assuming the case where OSC light Losc of one wavelength is arranged in the vicinity of 1510 nm. However, the wavelength arrangement of OSC light in this invention is not limited to the above specific example, and for example it is also possible to arrange the OSC light in a wavelength band separated on the long wavelength side with respect to the main signal lights of the C-band. Moreover, the wavelength band of the main signal lights may be outside of the C-band.

In the single repeating section shown in FIG. 1, the device connected to the left side of the transmission path 1 is the optical transmission apparatus 10 on the transmission side, while the device connected to the right side of the transmission path 1 is the optical transmission apparatus 30 on the reception side. The transmission side optical transmission apparatus 10 has a main signal optical amplifier 11 serving as a main signal light amplifying device for amplifying the main signal lights Ls up to a necessary level using a known optical amplifying device such as for example an erbium doped optical fiber amplifier (EDFA). The output port of the main signal optical amplifier 11 is connected to a transmission end of the transmission path 1. On the optical path between the output port of the main signal optical amplifier 11 and the transmission end of the transmission path 1, there is provided a multiplexer (optical filter) 13 serving as a multiplexing device for combining the output light from the main signal optical amplifier 11 and the OSC light Losc output from the OSC transmitter (OSCTX) 12 serving as a supervisory light generating device, and outputting this to the transmission path 1. Furthermore, on the optical path that propagates the OSC light between the output port of the OSC transmitter 12 and the multiplexer 13, there is sequentially arranged; a variable optical attenuator (VOA) 14 serving as a variable optical attenuating device, an optical isolator 15, an OSC optical amplifier 16 serving as a supervisory light amplifying device, and an optical isolator 17. Moreover there is provided: an optical divider 21 and an optical detector (PD) 22 serving as a second supervisory light power detection device, for monitoring the power of the OSC light Losc input to the variable optical attenuator 14; an optical divider 23 and an optical detector (PD) 24 serving as a first supervisory light power detection device, for monitoring the power of the OSC light Losc input to the multiplexer 13; and a control circuit (CONT) 25 serving as a control device for controlling the variable optical attenuator 14 and the OSC optical amplifier 16 based on detection results from the respective optical detectors 22 and 24.

The abovementioned OSC optical amplifier 16 has an amplifying band that includes the wavelength of the OSC light Losc generated by the OSC transmitter 12. Since as described above, the wavelength of the OSC light Losc is separated from the wavelength band of the main signal lights Ls, amplification of the OSC light Losc where the amplification bands are different, with an optical amplifier such as a general EDFA or the like is difficult. Therefore, as a specific configuration for the OSC optical amplifier 16, it is desirable to apply a semiconductor optical amplifier (SOA) such as that disclosed for example in J.-Y. Emery et al., "Two-section semiconductor optical amplifier power equalizer with 8 dBm output saturation power for 10 Gbit/s application", OAA'99, FB3-1, 1999. Furthermore it possible to apply an EDFA furnished with a plurality of optical fibers in stages of an amplifying medium such as disclosed for example in Nishihara Masato et. al. "S band EDFA temperature dependence", 2002 Electronic Information Communication Society, Electronics Society Conference, C-3-2. Moreover it is also possible to apply a Tm doped fluoride fiber amplifier such as disclosed for example in T. Sakamoto et al., "Gain-equalized thulium-doped fiber amplifiers for 1460 nm-band WDM signals", OAA'99, WD2-4, 1999.

In the case where an SOA is applied as the OSC optical amplifier 16, when the power of the OSC light input to the OSC optical amplifier 16 becomes large, the possibility that the OSC optical amplifier 16 is operated in a saturation band increases, so that there is concern that the transmission characteristics of the OSC light are deteriorated. In order to avoid such a situation, here the variable optical attenuator 14 is provided before the OSC optical amplifier 16, and by adjusting the power of the OSC light input to the OSC optical amplifier 16 using the variable optical attenuator 14, the output level of the OSC optical amplifier 16 is controlled to a desirable specified value. The output level of the OSC optical amplifier 16, and the attenuation amount of the variable optical attenuator 14, as described in detail later, are controlled by the control circuit 25, based on the detection results of the respective optical detectors 22 and 24. Even if light level control of the OSC optical amplifier 16 is not realized using the variable optical attenuator 14, provided this is a case where there is no occurrence of a problem of characteristic degradation such as reception waveform degradation, then it is possible to omit the variable optical attenuator 14.

Figure 6:
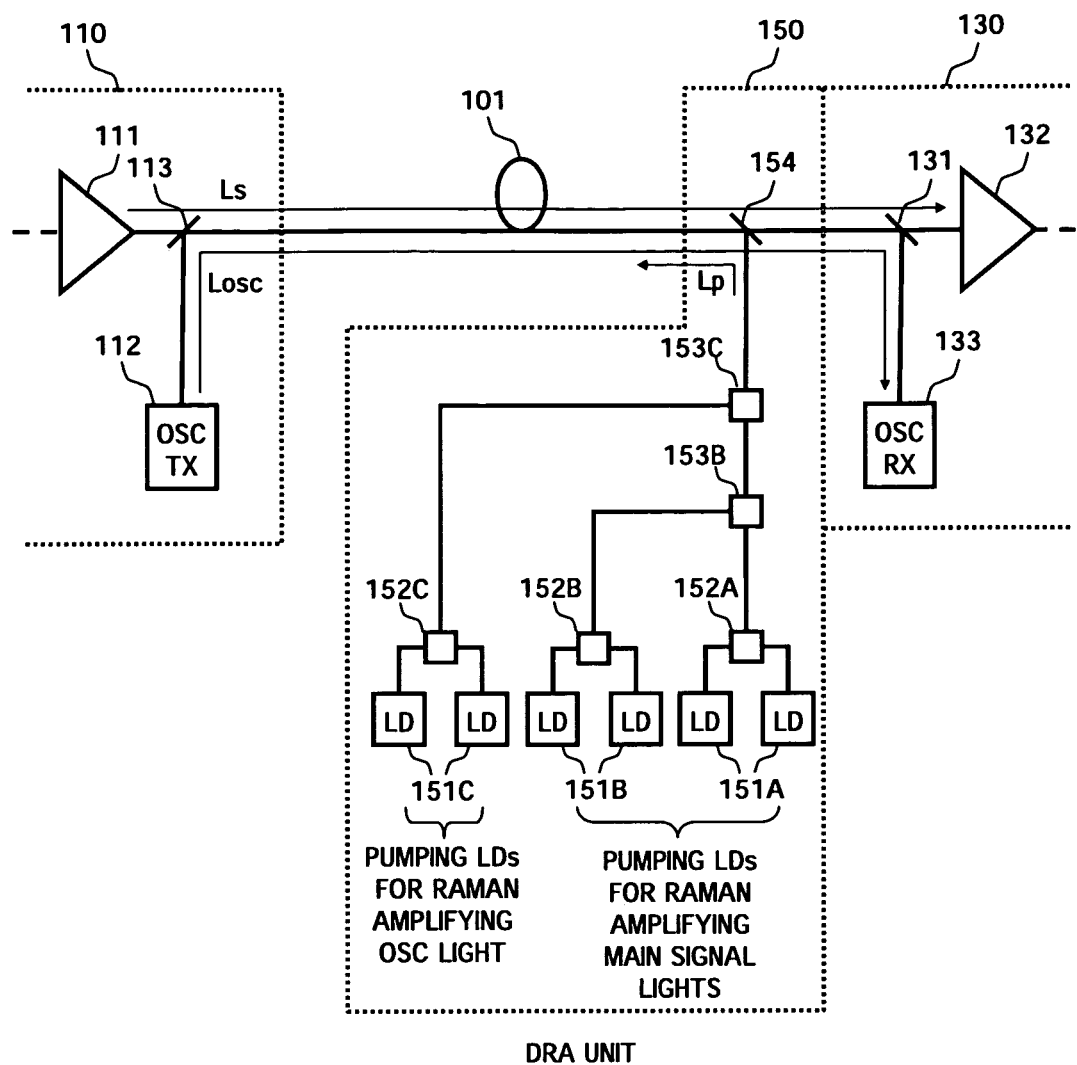
FIG. 6 is a block diagram showing a configuration example of a conventional optical communication system in which a DRA unit is applied to perform amplification of main signal light and OSC light.

The optical transmission apparatus 30 on the reception side comprises for example: a branching filter (optical filter) 31 that branches the light transmitted on the transmission path 1 into main signal lights Ls and OSC light Losc; a known main signal optical amplifier 32 such as an EDFA for amplifying the main signal lights Ls branched by the branching filter 31 up to a necessary level; and an OSC receiver (OSCRX) 33 for receiving the OSC light Losc branched by the branching filter 31. Here the branching filter 31 and the OSC receiver 33 function as the supervisory light receiving device. Furthermore, a DRA unit 50 serving as a transmission path distributed Raman amplifying device is provided on the optical path between the reception end of the transmission path 1 and the input port of the branching filter 31. The DRA unit 50 has: a plurality of pumping light sources (LDs) 51A and 51B that generate pumping light of a wavelength capable of Raman amplifying the main signal lights Ls; multiplexers 52A, 52B, and 53 for multiplexing output light of the respective pumping light sources 51A and 51B into one; and a multiplexer 54 for transmitting the pumping light Lp multiplexed by the multiplexer 53 onto the transmission path 1. By means of the pumping light Lp input from the multiplexer 54 into the transmission path 1, the main signal lights Ls propagated on the transmission path 2 is Raman amplified. The DRA unit 50 is different from the aforementioned DRA unit 150 shown in FIG. 6, in that a configuration for Raman amplifying the OSC light is not provided.

Next is a description of the operation of a single repeating section of the optical communication system.

In the optical communication system of the above described configuration, in the transmission side optical transmission apparatus 10, by providing the OSC optical amplifier 16 on the optical path that propagates the OSC light between from the output port of the OSC transmitter 12 to the input port of the multiplexer 13, the OSC light Losc transmitted to the transmission path 1 is amplified using the OSC optical amplifier 16 which is different to the amplifying device of the main signal lights Ls. As a result, even if a large repeating loss (span loss) is generated due to an increase in the distance of the repeating section, transmission of the OSC light Losc via the transmission path 1 between the respective optical transmission apparatuses 10 and 30 on the transmission side and the reception side can be reliably performed.

Here to describe in detail the advantage of amplifying and transmitting the OSC light on the transmission side, in the case where under conditions for generating a large span loss, the transmission power of the OSC light is insufficient, the reception power of the OSC light becomes less than the minimum reception level for the OSC receiver 33, and the proportion of the reception power with respect to the dark current generated by the OSC receiver 33 becomes small. Hence the possibility of generating a reception error of the OSC light increases. Furthermore, also if the ratio of the OSC light power to the noise light power in the input light of the OSC receiver 33 becomes small, the possibility of generation of a reception error of the OSC light increases.

In order to avoid the occurrence of an error due to the former drop in the OSC reception power, a configuration where the OSC optical amplifier is arranged on the reception side (on the optical path between the branching filter 31 and the OSC receiver 33) is also effective. However, since the noise light generated by the OSC optical amplifier itself on the reception side thereof is directly added to the input light of the OSC receiver 33, the ratio of the OSC light power to the noise light power becomes small, so that the possibility of generation of a reception error for the OSC light becomes high. On the other hand, if the configuration is such that the OSC optical amplifier is arranged on the transmission side, then both the drop in the OSC reception power and the drop in the ratio of the OSC light power to the noise light power can be suppressed, and the reception error of the OSC light can be effectively avoided.

The advantage of amplifying and transmitting the OSC light on the transmission side as described above is great. However, the transmission power for the OSC light need not necessarily be large. That is, in the optical communication system, it is desirable to be able to widely support with a single optical amplifier, from a condition where the span losses are small to a condition where they are large. Under conditions where the span losses are small and the transmission power of the OSC light is large, the power of the OSC light received by the OSC receiver 33 may exceed the maximum reception level of the OSC receiver 33, so that there is a possibility of the occurrence of a reception error. Furthermore, if the reception power of the OSC light exceeds the maximum absolute rating of the OSC receiver 33, there is the possibility of breakdown of the OSC receiver 33. Moreover if the transmission level of the OSC light is greater than the transmission level of the main signal light, the amount of OSC light leaking to the main signal light side in the branching filter 31 on the reception side increases, so that the negative effect of the control error of the main signal light becoming large, due to the leakage light of the OSC light, is also considered.

Therefore, in the present embodiment, by controlling the variable optical attenuator 14 and the OSC optical amplifier 16 by the control circuit 25, the transmission power of the OSC light is made to be within a predetermined range. To describe in detail the control by the control circuit 25, the transmission power of the OSC light can change attributable to; irregularities in the output power of the OSC transmitter 12 or irregularities in the losses in the optical components such as the optical isolators 15 and 17 arranged on the optical path that propagates the OSC light (individual differences, temperature characteristics, age deterioration, and so forth), and irregularities in the gain of the OSC optical amplifier 16 (polarization dependency, age deterioration, individual irregularities, and so forth). It is thus desirable to absorb these irregularities and control the transmission power of the OSC light to within a predetermined range.

Therefore, in the present embodiment, for example the optical divider 21 is provided between the OSC transmitter 12 and the variable optical attenuator 14, and a part of the OSC light input to the variable optical attenuator 14 is branched, and the optical power thereof is monitored by the optical detector 22. Together with this, the optical divider 23 is provided between the optical isolator 17 and the multiplexer 13, and a part of the OSC light input to the multiplexer 13 is branched, and the optical power thereof is monitored by the optical detector 24. Moreover control is performed with respect to the drive current of the variable optical attenuator 14 and the OSC optical amplifier 16 by the control circuit 25, based on the monitor results of the respective optical detectors 22 and 24.

Figure 2:
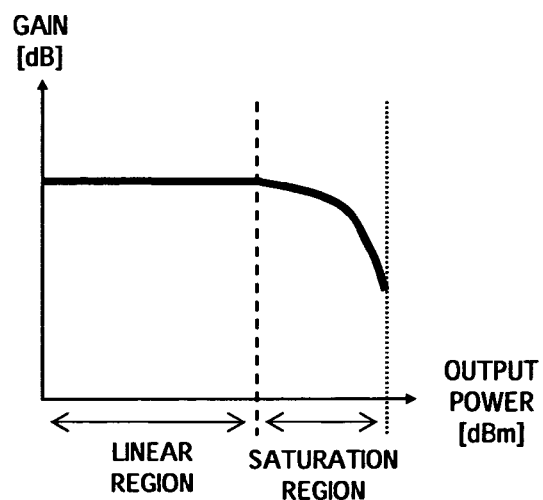
FIG. 2 is a diagram schematically showing a relationship between SOA gain and output power.

In the control by the control circuit 25, more specifically based on the monitor results in the optical detector 24, it is desirable to optimize the output level of the OSC optical amplifier 16 so that the transmission power of the OSC light to the transmission path 1 becomes a previously set target value. At this time, in the case where an SOA is applied as the OSC optical amplifier 16, then as described above, the power of the OSC light input to the SOA increases, so that when the SOA is operated in a saturation region a pattern effect arises, and the transmission characteristics of the OSC light are likely to deteriorate. FIG. 2 schematically shows a relationship between SOA gain and output power (output to gain characteristics). In the linear region, approximately constant gain is obtained, whereas in the saturation region, the gain is reduced as the input power increases, and the output power is reduced. In order to avoid this saturation operation of the SOA, the control circuit 25 uses; the monitor results of the respective optical detectors 22 and 24, information related to the output to gain characteristics of the SOA applied to the OSC optical amplifier 16, and information related to losses of the optical components (here the optical isolator 17 and the optical branching filter 23) arranged between from the output port of the OSC optical amplifier 16 to the input port of the multiplexer 13, to thereby control the variable optical attenuator 14 so that the SOA can operate in a gain constant region, and the transmission power of the OSC light to the transmission path 1 becomes a target value.

When performing control of the variable optical attenuator 14, simplification of the control by the control circuit 25 by controlling the drive current of the SOA to be constant, is desirable. Furthermore, the propagation path of the OSC light between from the output port of the OSC transmitter 12 to the input port of the OSC optical amplifier 16 is entirely constituted by polarization maintaining type fibers or devices, so there is the effect that the polarization state of the OSC light input to the OSC optical amplifier 16 is fixed at a polarization state (TE polarization or TM polarization) at which the gain of the OSC optical amplifier 16 becomes a maximum, and the saturation output of the OSC optical amplifier 16 is increased.

However, in the case where, different to the case of the SOA as described above, an optical amplifier in which reception wave form deterioration and the like due to the pattern effect does not occur even if the input power is large, is used for the OSC optical amplifier 16, then there is no particular need to provide a variable optical attenuator 14 on the input side to the OSC optical amplifier 16 (even if applied to the output side of the OSC optical amplifier 16 there is no problem). In this case, it is preferable if the drive current of the OSC optical amplifier 16 is feedback controlled based on the monitor results of the optical detector 24 on the output side, so that the transmission power of the OSC light to the transmission path 1 becomes the target value. Alternatively, the gain of the OSC optical amplifier 16 may be obtained using the monitor results of the respective optical detectors 22 and 24 on the input side and the output side, and the drive current of the OSC optical amplifier 16 may be controlled so that this gain becomes a predetermined value.

Furthermore, in the case of monitoring for the situation where there is no input of the OSC light in the optical detector 22 on the input side, then in consideration of safety, it is preferable to perform control to stop drive of the OSC optical amplifier 16.

According to the optical communication system as described above, in the transmission side optical transmission apparatus 10, by providing the OSC optical amplifier 16 on the optical path between the OSC transmitter 12 and the multiplexer 13, then even in the case where the span loss is large, the occurrence of a reception error in the optical transmission apparatus 30 on the reception side can be avoided so that it is possible to reliably receive the OSC light. Furthermore, since the OSC optical amplifier 16 is different to the amplifying device of the main signal lights, then even if a fault occurs in the transmission of the main signal lights due to some kind of failure, transmission of the OSC light can operate normally. As a result, the cause of failure on the main signal side can be quickly specified, and error recovery quickly implemented, so that an optical communication system having high reliability can be realized. Moreover the output power of the OSC transmitter is normally fixed at a preset level, whereas in the conventional system, this corresponds to the different span losses corresponding to the distance between repeating sections, or the various kinds of transmission paths, so that it is necessary to design and prepare several kinds of OSC transmitters. However by providing the OSC optical amplifier 16 on the transmission side, it becomes possible to correspond to the span losses over a wide range by controlling the output level of the OSC optical amplifier 16. Therefore it is also possible to eliminate the various kinds of OSC transmitters. In addition, compared to the configuration shown in FIG. 6 where the OSC light is subjected to transmission path distributed Raman amplifying, the total power of the pumping light Lp output from the DRA unit 50 becomes low. Therefore safety can be improved, and it is also possible to suppress the power consumption of the DRA unit 50. Moreover due to a reduction in the heat radiating space, the installability of the DRA unit 50 is also improved.

Next is a description of another embodiment of an optical communication system according to the present invention.

Figure 3:
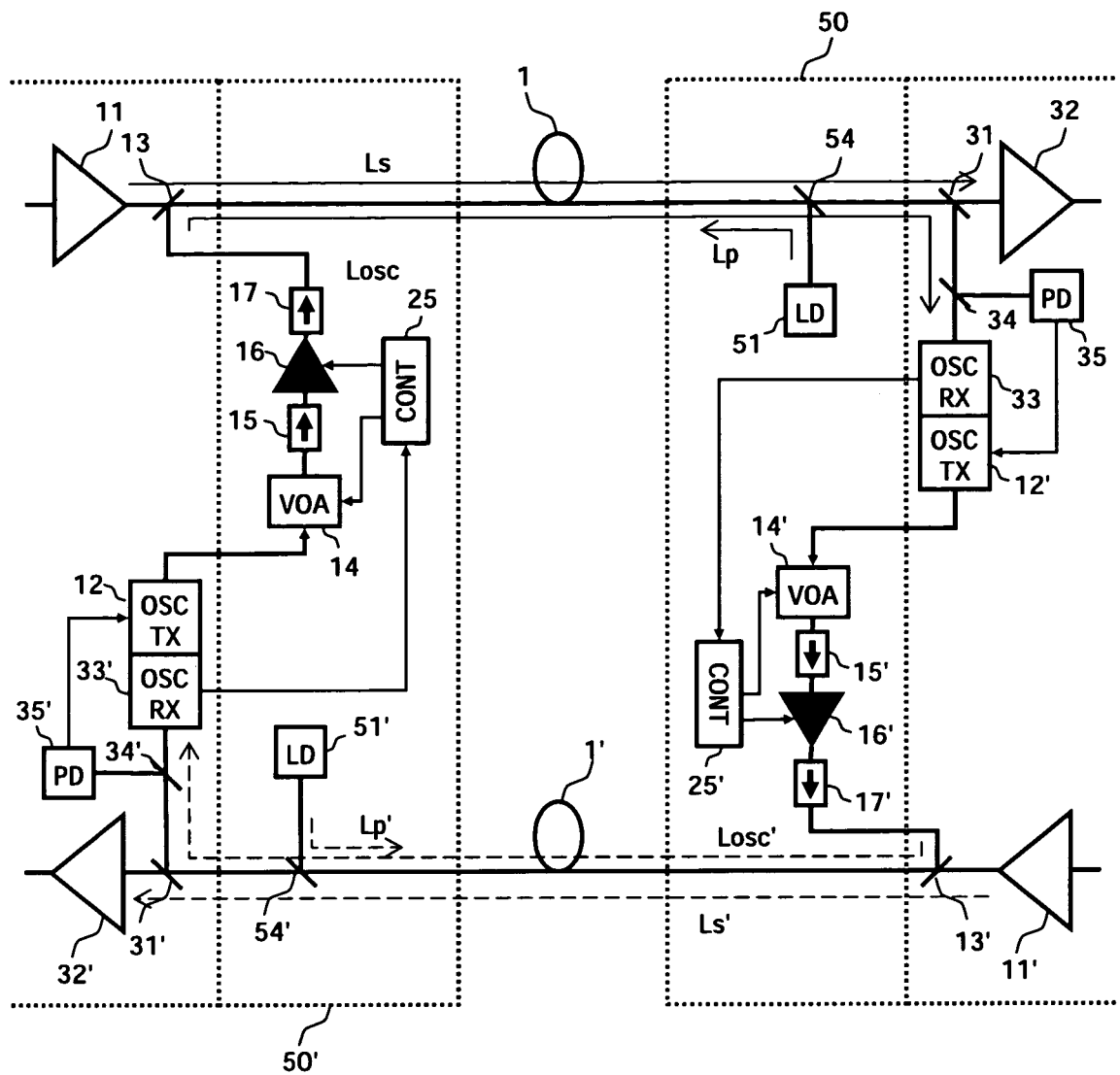
FIG. 3 is a block diagram showing a configuration of an other embodiment of an optical communication system according to the present invention.

FIG. 3 is a block diagram showing a configuration example of a single repeating section in an optical communication system of the other embodiment.

In the aforementioned optical communication system shown in FIG. 1, a configuration example is described where the power of the OSC light transmitted to the transmission path 1 is monitored, and control is performed so that the monitor value becomes a target value. On the other hand, in the optical communication system of FIG. 3, in a system configuration provided with a pair of transmission paths 1 and 1' corresponding to an uplink and a downlink, the reception level of the OSC light Losc that reaches to the OSC receiver 33 after being transmitted on the transmission path 1 on the uplink side, is monitored by an optical divider 34 and an optical detector 35, and the monitor information of the optical detector 35 is transmitted to an OSC transmitter 12' on the downlink side, and this monitor information is imposed on the OSC light Losc' transmitted on the transmission path 1' on the downlink side, and transmitted. Then, based on the above monitor information received by the OSC receiver 33' on the downlink side, the control circuit 25 on the uplink side controls the variable optical attenuator 14 and the OSC optical amplifier 16 so that the reception level of the OSC light Losc enters within a previously set range.

Furthermore, similarly to this, the reception level of the OSC light Losc' that reaches to the OSC receiver 33' after being transmitted on the transmission path 1' on the downlink side, is monitored by an optical divider 34' and an optical detector 35', and the monitor information of the optical detector 35' is transmitted to an OSC transmitter 12 on the uplink side, and this monitor information is imposed on the OSC light Losc transmitted on the transmission path 1 on the uplink side, and transmitted. Then, based on the above monitor information received by the OSC receiver 33 on the uplink side, the control circuit 25' on the downlink side controls the variable optical attenuator 14' and the OSC optical amplifier 16' so that the reception level of the OSC light Losc' enters within a previously set range.

In the abovementioned configuration shown in FIG. 3, the variable optical attenuators 14 and 14', the optical isolators 15 and 15', the OSC optical amplifiers 16 and 16', and the optical isolators 17 and 17' arranged on the optical path between the OSC transmitters 12 and 12' and the multiplexers 13 and 13' are provided inside the DRA units 50' and 50. Advantages of applying such a construction are that in the repeating section where the DRA unit is provided and it becomes necessary to perform Raman amplification of the main signal lights, since the span loss is usually a large value, application of the present invention is extremely effective. Moreover by providing the DRA unit and the OSC light amplification device as a single set, convenience is increased.

Also if the variable optical attenuators 14 and 14' and the OSC optical amplifiers 16 and 16' on the transmission side are feedback controlled based on the monitor results of the reception level of the OSC light as described above, results similar to the aforementioned case of the optical communication system shown in FIG. 1 can be obtained.

In the above respective embodiments, the description has been for where the control target value (range) for the transmission power of the OSC light or for the reception level is previously set in the control circuits 25 and 25'. However it is necessary to appropriately set this control target value corresponding to the system requirements such as the distances of the respective repeating sections on the system, and the type of transmission paths. The system requirements as described above are normally ascertained by a system management section that manages all of the optical communication system. Therefore the system management section may calculate a control target value corresponding to the respective repeating sections, and notify this to the various control circuits 25 and 25'. If in this way the system management section notifies the control target values for the respective repeating sections, then for example it is possible to flexibly correspond, even in the case where the system requirements are changed after starting operation of the system.

What is claimed is:

1. An optical transmission apparatus comprising: an amplifier configured to amplify main signal lights transmitted by an optical communication system and transmit the amplified main signal lights to an output transmission path.

2. An optical transmission apparatus according to claim 1, wherein the controller controls a drive current of SOA to be constant.

3. An optical transmission apparatus according to claim 1, wherein the optical path between the output end of the transmitter and an input end of the SOA has polarization maintaining characteristics, and polarization characteristics of the supervisory signal light input to the SOA are set to maximize gain of the SOA.

4. An optical communication system that repeatedly transmits main signal lights by a plurality of optical transmission apparatuses arranged on a transmission path, and transmits system information by transmitting and receiving a supervisory signal light different to the main signal lights between optical transmission apparatuses of respective repeating sections, wherein
- the optical transmission apparatus according to claim 1 is provided on a transmission side of the respective repeating sections, and
- an optical transmission apparatus on a reception side of the respective repeating sections includes a supervisory signal light receiver configured to spectrally demultiplex and receiver the supervisory signal light contained in light transmitted on the output transmission path, and a transmission path distributed Raman amplifier configured to supply, to the output transmission path, pumping lights for Raman amplifying the main signal lights propagated on the output transmission path.

5. An optical communication system according to claim 4, wherein
- the respective repeating sections have a pair of transmission paths corresponding to an uplink and a downlink, and
- a transmission side optical transmission apparatus corresponding to one link, and a reception side optical transmission apparatus corresponding to the other link are combined into one apparatus, so that the SOA and the transmission path distributed Raman amplifier within the combined apparatus are unitized.

\* \* \* \* \*